US009721236B2

(12) United States Patent
Gauvin et al.

(10) Patent No.: US 9,721,236 B2
(45) Date of Patent: Aug. 1, 2017

(54) DISTRIBUTED PROCESSING OF A CHECK IMAGE

(75) Inventors: Timmy L. Gauvin, Atlanta, GA (US); Kerry M. Cantley, Fort Mill, SC (US); Deborah N. Bennett, Conyers, GA (US); Eric S. Sandoz, Concord, CA (US); Geoffrey R. Williams, Midlothian, TX (US); James G. Ronca, Decatur, GA (US)

(73) Assignee: Bank of America Corporation, Charlotte, NC (US)

( * ) Notice: Subject to any disclaimer, the term of this patent is extended or adjusted under 35 U.S.C. 154(b) by 718 days.

(21) Appl. No.: 13/570,476

(22) Filed: Aug. 9, 2012

(65) Prior Publication Data
US 2014/0046841 A1 Feb. 13, 2014

(51) Int. Cl.
*G06Q 40/00* (2012.01)
*G06Q 20/22* (2012.01)
*G06Q 20/04* (2012.01)
*G06Q 40/02* (2012.01)

(52) U.S. Cl.
CPC ........... *G06Q 20/042* (2013.01); *G06Q 40/02* (2013.01)

(58) Field of Classification Search
CPC ........ G06Q 40/00; G06Q 20/18; G06Q 20/22; G06Q 40/02
USPC ...................................................... 705/40, 45
See application file for complete search history.

(56) References Cited

U.S. PATENT DOCUMENTS

| 4,947,321 A | 8/1990 | Spence et al. |
|---|---|---|
| 5,159,548 A | 10/1992 | Caslavka |
| 5,198,975 A | 3/1993 | Baker et al. |
| 5,488,671 A | 1/1996 | Kern |
| 5,594,226 A | 1/1997 | Steger |
| 5,963,659 A | 10/1999 | Cahill et al. |
| 6,045,039 A * | 4/2000 | Stinson ................. G06Q 20/18 235/379 |
| 6,055,327 A | 4/2000 | Aragon |

(Continued)

OTHER PUBLICATIONS

Antonella et al.; Introducing ATMs in INdia: a contexual inquiry; Nov. 3, 2003; Elsevier, web, 30-39.*

(Continued)

*Primary Examiner* — Marissa Liu
(74) *Attorney, Agent, or Firm* — Weiss & Arons LLP; Michael A. Springs, Esq.

(57) ABSTRACT

Apparatus and methods for distributed processing of a check image are provided. A payee may submit a request to deposit a negotiable instrument. The request may be received at a first financial institution. The negotiable instrument may be a check. A transaction record may be generated at the time of the request. The transaction record may be based on information handwritten or printed on the negotiable instrument. The transaction record may be transmitted to a second financial institution. The second financial institution may conduct a fraud analysis based on the transaction record. The second financial institution may transmit a fraud indicator to the first financial institution. Based on the fraud indicator, the first institution may accept or deny the request of the payee. Apparatus and methods may distribute computing resources associated with detection of fraudulent negotiable instrument. The resources may be distributed among the first and second financial institutions.

5 Claims, 9 Drawing Sheets

(56) References Cited

U.S. PATENT DOCUMENTS

| | | | |
|---|---|---|---|
| 6,073,121 A | 6/2000 | Ramzy | |
| 6,129,273 A | 10/2000 | Shah | |
| 6,181,837 B1 | 1/2001 | Cahill et al. | |
| 6,384,844 B1 | 5/2002 | Stewart et al. | |
| 6,574,377 B1 | 6/2003 | Cahill et al. | |
| 6,863,214 B2 | 3/2005 | Garner, IV et al. | |
| 6,959,326 B1 | 10/2005 | Day et al. | |
| 7,004,382 B2 | 2/2006 | Sandru | |
| 7,020,320 B2 | 3/2006 | Filatov | |
| 7,090,131 B2 | 8/2006 | Natsuno | |
| 7,124,113 B1 | 10/2006 | Fairclough et al. | |
| 7,165,723 B2 | 1/2007 | McGlamery et al. | |
| 7,349,884 B1 | 3/2008 | Odom et al. | |
| RE40,220 E | 4/2008 | Nichols et al. | |
| 7,379,978 B2 | 5/2008 | Anderson et al. | |
| 7,389,914 B1 | 6/2008 | Enright et al. | |
| 7,391,934 B2 | 6/2008 | Goodall et al. | |
| 7,461,775 B2 | 12/2008 | Swift et al. | |
| 7,471,818 B1 | 12/2008 | Price et al. | |
| 7,606,408 B2 | 10/2009 | Takiguchi | |
| 7,680,317 B2 | 3/2010 | Adelberg et al. | |
| 7,680,318 B2 | 3/2010 | Agrawal et al. | |
| 7,689,025 B2 | 3/2010 | Takiguchi | |
| 7,752,286 B2 | 7/2010 | Anderson et al. | |
| 7,757,938 B2 | 7/2010 | Richardson et al. | |
| 7,856,403 B2 | 12/2010 | Venturo et al. | |
| 7,962,412 B2 | 6/2011 | Omura et al. | |
| 8,045,818 B2 | 10/2011 | Sato et al. | |
| 8,052,040 B2 | 11/2011 | Stover | |
| 8,121,950 B2 | 2/2012 | Hassanein et al. | |
| 8,162,125 B1 | 4/2012 | Csulits et al. | |
| 8,467,591 B1 | 6/2013 | Csulits et al. | |
| 2002/0026365 A1* | 2/2002 | Natanzon | G06Q 20/02 705/16 |
| 2002/0067827 A1 | 6/2002 | Kargman | |
| 2002/0067846 A1 | 6/2002 | Foley | |
| 2004/0076320 A1 | 4/2004 | Downs, Jr. | |
| 2004/0133516 A1 | 7/2004 | Buchanan et al. | |
| 2004/0217170 A1 | 11/2004 | Takiguchi et al. | |
| 2005/0035193 A1* | 2/2005 | Gustin | G06Q 20/10 235/379 |
| 2005/0139670 A1 | 6/2005 | McGlamery et al. | |
| 2005/0139671 A1 | 6/2005 | McGlamery et al. | |
| 2005/0144131 A1 | 6/2005 | Aziz | |
| 2005/0144189 A1 | 6/2005 | Edwards et al. | |
| 2005/0281449 A1 | 12/2005 | Takiguchi | |
| 2005/0281450 A1 | 12/2005 | Richardson | |
| 2006/0088199 A1 | 4/2006 | Shizuka et al. | |
| 2006/0124727 A1 | 6/2006 | Kotovich et al. | |
| 2006/0144937 A1 | 7/2006 | Heilper et al. | |
| 2006/0184441 A1 | 8/2006 | Haschka et al. | |
| 2006/0186194 A1* | 8/2006 | Richardson et al. | 235/379 |
| 2006/0191998 A1 | 8/2006 | Mueller et al. | |
| 2006/0202012 A1* | 9/2006 | Grano | G06Q 20/04 235/379 |
| 2006/0219773 A1 | 10/2006 | Richardson | |
| 2006/0242062 A1 | 10/2006 | Peterson et al. | |
| 2007/0022053 A1 | 1/2007 | Waserstein et al. | |
| 2007/0064991 A1 | 3/2007 | Douglas et al. | |
| 2007/0886642 A1 | 4/2007 | Foth et al. | |
| 2007/0172109 A1 | 7/2007 | Agrawal et al. | |
| 2007/0215691 A1 | 9/2007 | Swift et al. | |
| 2007/0217669 A1 | 9/2007 | Swift et al. | |
| 2007/0267477 A1 | 11/2007 | Schott et al. | |
| 2007/0288382 A1 | 12/2007 | Narayanan et al. | |
| 2008/0002886 A1 | 1/2008 | Revow et al. | |
| 2008/0135610 A1 | 6/2008 | Roh | |
| 2008/0137939 A1 | 6/2008 | Wang et al. | |
| 2008/0140552 A1 | 6/2008 | Blaikie | |
| 2008/0279455 A1 | 11/2008 | Wall | |
| 2009/0018960 A1 | 1/2009 | Gawne | |
| 2009/0037339 A1 | 2/2009 | Ancell et al. | |
| 2009/0114715 A1 | 5/2009 | Mueller et al. | |
| 2009/0164372 A1 | 6/2009 | Dell et al. | |
| 2009/0236413 A1 | 9/2009 | Mueller et al. | |
| 2011/0206266 A1 | 8/2011 | Faulkner et al. | |
| 2011/0251956 A1 | 10/2011 | Cantley et al. | |
| 2011/0264572 A1 | 10/2011 | Cucinotta | |
| 2011/0280450 A1 | 11/2011 | Nepomniachtchi et al. | |
| 2012/0189186 A1 | 7/2012 | Csulits et al. | |
| 2013/0056531 A1 | 3/2013 | Sato et al. | |
| 2013/0243303 A1 | 9/2013 | Imae et al. | |
| 2013/0287284 A1 | 10/2013 | Nepomniachtchi et al. | |

OTHER PUBLICATIONS

Ray Higgins, "Ramifications of MICR Mismatch in Check Image Exchange," All My Papers Publication, Third Edition, Jan. 2008.

Randy Malchar, "The Value of MICR for the Remote Check Depositor," Panini Advanced Solutions for Document Processing, 2008.

Ray Higgins, "Small Check Scanner MICR Read Performance Benchmark Study," Silvery Bullet Technology, Feb. 27, 2006.

"Instant verification of check quality and usability," Parascript, LLC, Longmont, Colorado, retrieved from the World Wide Web on Jul. 17, 2012.

"Check 21: Harnessing a Billion Points of Light," Mercator Advisory Group, May 24, 2004, Maynard, Massachusetts.

"Check Encoders," Starex Financial Systems—Banking Equipment.com, Northridge, California, retrieved from the World Wide Web on Jul. 17, 2012.

"Let's face it—it's hard to keep up," Silver Bullet Technology, Inc., Pensacola, Florida, retrieved from the World Wide Web on Jul. 17, 2012.

Klein, Bob, et al., "Image Quality and Usability Assurance: Phase 1 Project," The Financial Services Technology Consortium (Available from BITS—The Financial Services Roundtable, Washington, D.C.), Aug. 23, 2004.

"Electronic check processing solutions: Choosing the right option for retail payments," First Data, 2008, Atlanta, Georgia.

"Reduce exception item processing costs: New technology paves the way to new saving," Cummins Allison Corporation, Mt. Prospect, Illinois, retrieved from the World Wide Web on Jul. 16, 2012.

"Check 21 and Image Security," The Standard Register Company, Dec. 8, 2003, Wayne, New Jersey.

"X9LIB Software Development Toolkit," All My Papers, Aug. 8, 2012, Saratoga, California.

"MICR V Encoder M-570D," Progressive Business Systems, Inc., 2011, Auburn, Georgia.

"Correcting the Codeline (MICR line)," Financial Management Service—A Bureau of the United States Department of the Treasury, Washington, D.C, retrieved from the World Wide Web on Jul. 18, 2012.

"Vision IP:Check21—Delivering an end-to-end, image-enabled electronic payments environment," Metavante Corporation, 2008, Milwaukee, Wisconsin.

* cited by examiner

| 302 | 304 | 306 | 308 | 310 | 312 | 314 | 316 | 318 | 320 | 322 | 323 |
|---|---|---|---|---|---|---|---|---|---|---|---|
| Check Number | Account Identifier | Payee | Payee Family | Check Date | Check Amount | Dollars | Comment | Comment Family | Signature Party | Scan Location | Machine Readable Identifier |

DISTRIBUTED PROCESSING OF A CHECK IMAGE

FIELD OF TECHNOLOGY

Aspects of the present disclosure relate to assessing the authenticity of a negotiable instrument.

BACKGROUND

Although transactions are increasingly executed online and using transaction cards, negotiable instruments continue to be used for executing transactions. Online transactions and transactions based on transaction cards are executed based largely on digital transaction data. A negotiable instrument, such as a check, includes an instruction of a customer a financial institution. The instruction may include an order instructing the financial institution to pay a sum certain to a payee.

A financial institution that is subject to an order to pay the sum certain may be a drawee. The customer that orders the drawee to pay the sum certain may be a drawer.

A check may be issued by the drawer completing a template. The template may include one or more segments. The segments may include pre-printed information. The pre-printed information may include an account number of the drawer. The pre-printed information may include a routing number associated with the drawee. The pre-printed information may be printed on a face of the template in magnetic ink. The magnetic ink may be readable by a device, such as an Automatic Teller Machine (hereinafter, "ATM") that is capable of magnetic ink character recognition (hereinafter, "MICR"). The ATM may read MICR data recorded on a check and associate the check with a particular drawee and drawer.

A segment of the template may be completed by the drawer. The segment completed by the drawer may be completed by handwriting an entry. The ability to complete the template easily and simply by hand increases a versatility of a check. The drawer issuing the check only requires a writing instrument and the template to issue the check. An ability to issue a check without interacting with an electronic device may be a reason checks remain a popular mode of payment among drawers and payees. However, the popularity of checks has been accompanied by check fraud.

Check fraud may include a printing of a template that is not authorized by the drawer or the drawee. Check fraud may include completing a template without authorization from the drawer. Access to copies of a template and an ability to complete the template by handwriting entries may result in a first layer of complexity with respect to detecting a fraudulent check.

For example, MICR data is typically printed on the face of the check in plain view. A forger wishing to create a fraudulent check needs simply to obtain a copy of a check. Because the remaining segments of the template may be completed by hand, the handwriting of the drawer may be forged or imitated.

To detect the fraud, an analysis of handwriting on the check may be performed. To detect the fraud, it may be advantageous to cross-check and/or correlate various segments on an issued check. For example, a cross-check may include verifying that the MICR data printed on the check is validly associated with a name of a drawer printed on the face of the check.

A second layer of complexity may arise as a result of processing of a check by one or more financial institutions.

The payee may receive the check from the drawer. The payee may receive the check as payment for services or goods provided to the drawer. To convert the check into cash, the payee may present the check to a depositary financial institution (hereinafter, "depositary bank"). The depositary bank may provide financial services to the payee. A service provided by the depositary bank may include processing of a check issued by a drawer.

Processing may include receiving a check from the payee. Processing may include receiving a request from the payee to credit an account of the payee. The credit may correspond to an amount indicated in a segment handwritten by the drawer on the check.

The depositary bank may receive the check and transmit a copy of the check to the drawee. The depositary bank may request that the drawee transfer funds to the depositary bank. The funds may correspond to an amount indicated on the check.

Upon receiving the copy of the check, the drawee may attempt to assess an authenticity of the check. To assess authenticity, the drawee may attempt to detect a fraudulent check. A fraudulent check may be detected by examining one or more segments of the template. For example, upon inspection, a signature segment may include a signature that does not correlate to a known signature of the drawer. A visual inspection of the check may indicate that a numerical segment stating the amount may not correlate to a segment describing the amount in words. However, a visual inspection may be associated with time and labor costs.

The handwritten nature of a check may add complexity to detection of a fraudulent check. The complexity is further compounded by a sheer magnitude of checks that may be transmitted daily to a drawee.

A drawee may receive in excess of $25*10^6$ checks daily. In view of the magnitude of checks, detecting a fraudulent check by a visual inspection of each check is not feasible. Furthermore, a visual inspection may not expose inherent defects of a fraudulent check. For example, a check may include a legitimate account number held at a drawee. However, a logo segment on the check may not correspond to a logo associated with the drawee.

Processing $25*10^6$ checks daily may present an automated processing challenge. Computer-based deciphering of human handwriting may be a task that may require expensive and expansive computing resources.

In view of the challenges of detecting a fraudulent check, depositary banks and drawees may suffer a monetary loss. Furthermore, a depositary bank and, consequently, drawees, may be subject to regulations that require "clearing" of a check within a specified time window. The specified time window may restrict an amount of time available for the depositary bank or drawee to assess an authenticity of a presented check.

It would be desirable to provide a fraud detection system that utilizes distributed computing resources. It would be desirable to provide a distributed fraud detection system that includes analysis of segments of an issued check. It would be desirable to provide a distributed fraud detection system that includes analysis of handwritten segments on the issued check. It would be desirable to provide a distributed fraud detection system that includes expedited fraud detection analysis.

It would be desirable, therefore, to provide apparatus and methods for distributed processing of a check image.

SUMMARY

Apparatus and methods for distributed processing of a check image are provided.

Methods may include processing a digital image of a negotiable instrument. The negotiable instrument may include an order of a drawer. The order may direct a drawee to pay an amount to a payee.

Methods may include receiving the negotiable instrument from the payee, producing a digital image of the negotiable instrument, generating a transaction record and transmitting the transaction record to the drawee. The transaction record may be generated based on the negotiable instrument. The transaction record may be generated based on the digital image.

Methods may include receiving, from the drawee, a fraud detection analysis result based on the transaction record, and accepting, or declining to accept, the negotiable instrument from the payee.

Apparatus may include a system for processing a request of a payor to credit an amount to an account of a payee. The system may include a self-service kiosk associated with a first financial institution. The self-service kiosk may include a scanner configured to capture a digital image of a negotiable instrument. The system may include a first processor device programmed to construct a transaction record. The transaction record may be constructed based on the negotiable instrument. The transaction record may be constructed based on the digital image.

The system may include a fraud-detection apparatus associated with a second financial institution. The fraud-detection apparatus may include a second processor device programmed to derive a fraud indicator. The fraud indicator may be derived based on the transaction record.

The system may include a financial network linking the first financial institution and the second financial institution. The network may be configured to route the transaction record from the self-service kiosk to the fraud-detection apparatus, and the fraud indicator from the fraud-detection apparatus to the self-service kiosk.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows illustrative information in accordance with the principles of the invention;

DETAILED DESCRIPTION OF THE DISCLOSURE

Apparatus and methods for distributed processing of a negotiable instrument are provided. Apparatus and methods may distribute computing costs of fraud detection between a first financial institution and second financial institution. Apparatus and methods may distribute computing resources for fraud detection between a first financial institution and second financial institution.

The negotiable instrument may be a digital image of a negotiable instrument. The negotiable instrument may be a check. The check may include an order given by a drawer. The drawer may order that a drawee transfer funds to a payee.

The order may be memorialized in a check. The check may include a template that includes one or more segments. The drawer may complete the segments of the template by handwriting an entry into the one or more fields. The drawer may furnish a completed check template to the payee. The drawer may furnish the completed check as payment for goods or services provided by the payee.

The payee may receive the check from the drawer. The payee may deposit the check at a depositary bank. The depositary bank may create a digital image of the check deposited by the payee. The drawee may be the depositary bank. The depositary bank may be the drawee. The drawer may be the drawee. The drawer may be the depositary bank. The drawer may be any suitable drawer. The drawee may be any suitable drawee. The depositary bank may be any suitable depositary bank. The payee may be any suitable payee. Apparatus and methods may distribute computing costs and/or resources of fraud detection between the drawee and the depositary bank.

Methods may include receiving the negotiable instrument from the payee. The receiving may include a presenting a negotiable instrument to a depositary bank. The receiving may include receiving a request, from the payee, to credit an account of the payee. The credit may correspond to an amount indicated on the negotiable instrument. The receiving may include presenting a check to a teller of the depositary bank.

Methods may include producing a digital image of the negotiable instrument. The digital image may be generated at a time the check received by a depositary bank. The digital image may be generated by the depositary bank. The digital image may be generated at a time the payee submits the check for deposit to the depositary bank.

For example, the check may be scanned at the time the payee presents the check for deposit. As a further example, a depositary bank may permit the payee to provide a digital image of the check to the depositary bank. The payee may provide the digital image by taking a digital photograph of the check. The payee may transmit the digital photograph of the check to the depositary bank.

Figure 1:
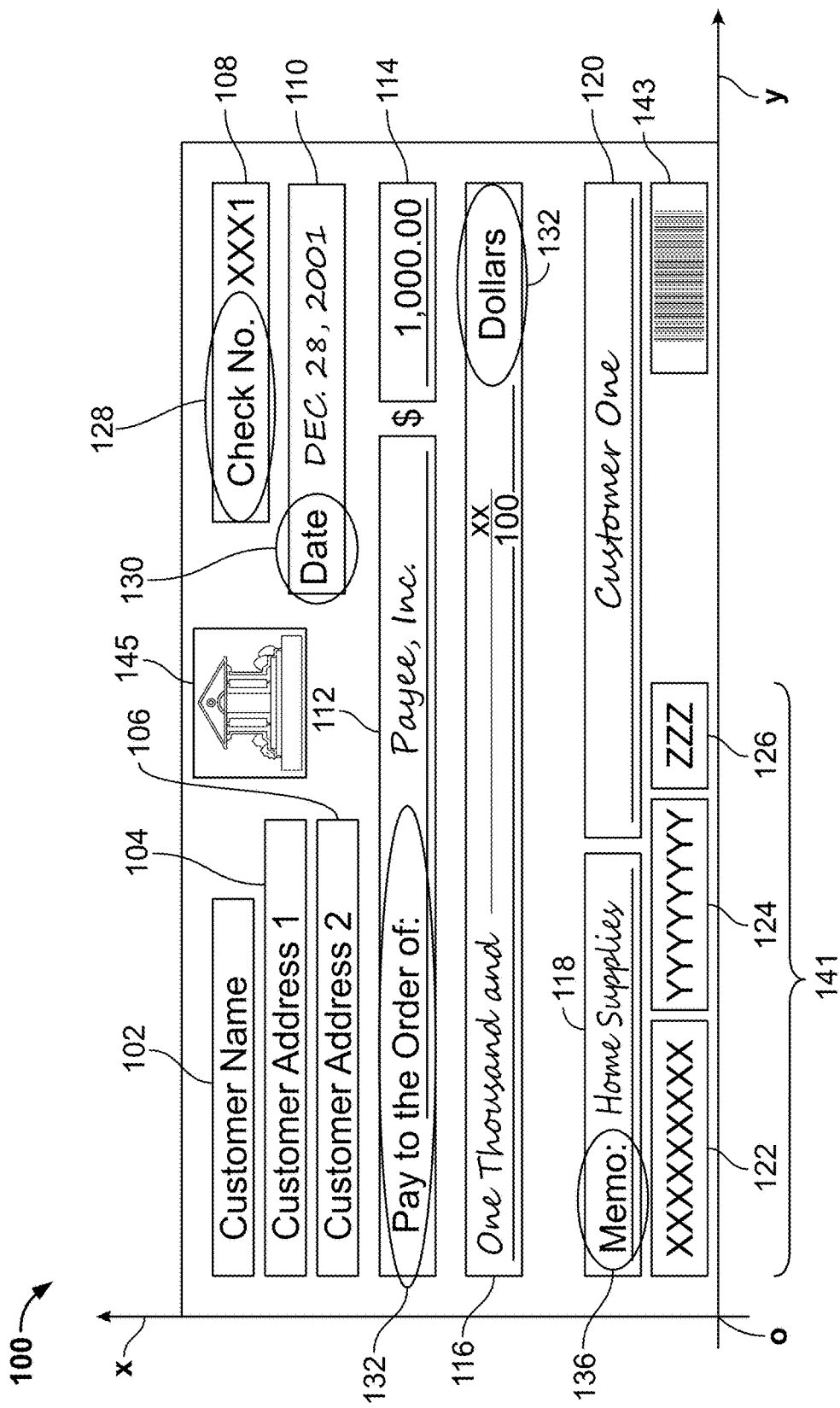
FIG. 1 shows an illustrative source of information that may be used in accordance with the principles of the invention.

The digital image may include a digital front image and/or a digital back image. FIG. 1 shows an illustrative digital front image 100 of an exemplary negotiable instrument.

Front image 100 may include one or more segments. Each of the one or more segments may be completed by a handwritten entry. Each of the one or more segments may be completed by a printed entry. Handwriting may include cursive or script information written by hand or printed by machine. Printed character text may be block-style letters that are written by hand or printed by machine.

For example, a check issued by an individual-drawer may be completed by hand-writing. A check issued by an institution or commercial drawer may be printed. A check may include a mix of printed and handwritten segments. For example, a check issued by a commercial entity may include printed MICR data and a handwritten signature.

Each field of image 100 may correspond to information that may be included on the front of a check. In FIG. 1, a segment may be identified by rectangular boxes. For example, image 100 may include one or more of drawer name segment 102, drawer address 1 segment 104, drawer address 2 segment 106, check number segment 108, date segment 110, payee segment 112, amount segment 114, dollars segment 116, comment segment 118, drawer signature segment 120, routing number segment 122, account number field 124, check number field 126 and any other suitable segments.

Image 100 may include one or more segment identifiers. Each segment identifier may correspond to a type of information that is displayed on the check to identify a check segment. For example, check image 100 may include one or more of "check number" segment identifier 128, "date" segment identifier 130, "pay-to-the-order-of" segment identifier 132, "dollars" segment identifier 134, "memo" field identifier 136 and any other suitable segment identifiers.

Figure 2:
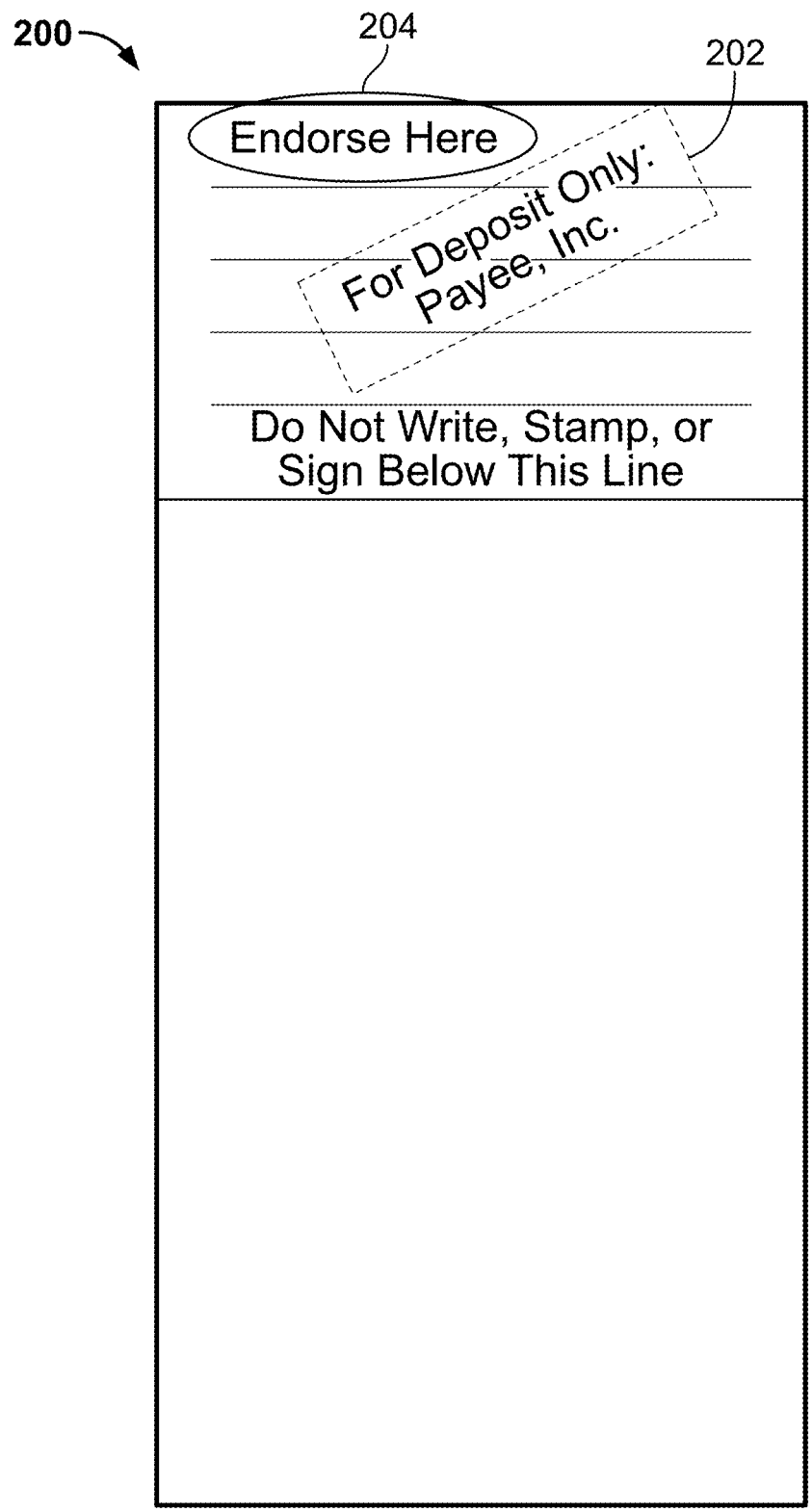
FIG. 2 shows another illustrative source of information that may be used in accordance with the principles of the invention.

FIG. 2 shows an illustrative back image 200 of an illustrative negotiable instrument. Back image 200 may include one or more segments. Each segment may correspond to a type of information that is included on the back of a check. In FIG. 2, segments are identified by rectangular boxes. For example, back image 200 may include payee endorsement segment 202 and any other suitable segments.

Back image 200 may include one or more segment identifiers. Each segment identifier may correspond to a type of information that is displayed on the check to identify a check segment. For example, check image 200 may include "endorse-here" segment identifier 204 and any other suitable segment identifiers.

Methods may include generating a transaction record. The transaction record may be based on the digital image. The transaction record may include information extracted from the digital image of a negotiable instrument. The transaction record may include information obtained directly from a tangible or "hard copy" of a negotiable instrument. Methods may include processing the digital image of a negotiable instrument.

FIG. 3 shows illustrative transaction record 300. Transaction record 300 may include one or more fields such as check number 302, account identifier 304, payee 306, payee family 308, check date 310, check amount 312, dollars 314, comment 316, comment family 318, signature 320, scan location 322 and machine readable identifier 323. Machine readable identifier 323 may include bar coded information.

Each of the fields may correspond to a segment of a check. The check may include one or more segment identifiers that correspond to the field. For example, the segment identifiers may include "DATE," "PAY TO THE ORDER OF," "DOLLARS," "MEMO" and any other suitable identifiers.

Table 1 shows illustrative transaction record fields, illustrative corresponding check segments and illustrative corresponding segment identifiers.

TABLE 1

Illustrative transaction record fields, illustrative corresponding check segments and illustrative corresponding segment identifiers.

| Illustrative transaction record fields (FIG. 3 reference numeral) | Illustrative corresponding check segments (FIG. 1 reference numeral) | Illustrative corresponding form segment identifiers (FIGS. 1 or 2 reference numerals) |
| --- | --- | --- |
| Check number (302) | Check number segment (108) Check number segment (126) | CHECK NO. (128) |
| Account identifier (304) | Customer name segment (102) Customer address 1 segment (104) Customer address 2 segment (106) Routing number segment (122) Account number segment (124) | |
| Payee (306) | Payee segment (112) | PAY TO THE ORDER OF (132) |
| | Payee endorsement segment (302) | ENDORSE HERE (204) |
| Payee family (308) | Payee segment (112) | PAY TO THE ORDER OF (132) |
| Check date (310) | Date segment (110) | DATE (130) |
| Check amount (312) | Amount segment (114) | |
| Dollars (314) | Dollars segment (116) | DOLLARS (134) |
| Comment (316) | Comment segment (118) | MEMO (136) |
| Comment family (318) | Comment segment (118) | MEMO (136) |
| Signature (320) | Signature segment (120) | |
| Bar Code (323) | Bar Code segment (143) | |

The generating of the transaction record may include extracting information from the digital image. The extracted information may include a drawer's signature on the negotiable instrument.

An illustrative method for extracting information from the digital image may include identifying an origin "O" of the front image 100. Origin "O" may be identified as a location on check image 100 from which to quantify the relative locations of the segments. For example, origin O may be coincident with the lower left corner of a check upon which check image 100 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes.

For example, the location of a rectangular segment may be quantified as the coordinates of four corners of a rectangle. Any other suitable scheme for quantifying segment locations may be used.

Generating the transaction record may include generating text data. The text data may be generated based on information extracted from the digital image. The text data may be generated based on a handwritten segment of the negotiable instrument. The text data may be generated based on information printed on the negotiable instrument.

Generating the transaction record may include converting a signature from a handwritten entry into text. The converting may be performed by a processor. The processor may be further configured to run an application that translates content of a segment from handwriting to estimated block text. The application may be any suitable application.

For example, the application may be an application such as that available under the trademark PARASCRIPT® from Parascript, LLC, Longmont, Colo. The application may pre-process the segment content by applying one or more mathematical filters to the segment content. The filter may include, for example, tools for line-detection, edge detection, curve detection, shape detection, contrast adjustment, feature density (such as the amount of "ink" pixels per unit area of field or per unit length of a horizontal or vertical axis of the field), feature density distribution (such as the amount of "ink" pixels per unit area as a function of location in the field), topological quantification (such as the number, size, distribution and perimeter per unit area of closed forms in the content) and any other suitable tools.

For example, the text data may include a numerical identifier of the negotiable instrument. The numerical identifier may be the check number. The numerical identifier may include segment 108. The text data may include the amount. The amount may correspond to numbers handwritten by the drawer in field 114. The amount may correspond to words handwritten by the drawer within segment 116.

The text data may include a drawee name. The drawee may be identified based on segment 145. Segment 145 may be a logo associated with a drawee. Segment 145 may include text associated with a drawee. Segment 145 may include address or name information associated with a drawee.

The text data may include an account number on the negotiable instrument. The account number may correspond to a MICR data 141 printed on a check. Segment 141 may include a routing number 122. Segment 141 may include an account number 124.

The text data may include a payee. The payee may be identified based on information entered into segment 132. The text data may include any suitable information.

The processing of the digital image may be performed at a time the negotiable instrument is presented for deposit. The processing of the digital image may be performed by the depositary bank. The processing may be distributed among various times and locations.

For example, at different times throughout a day, payees may present checks to a depositary bank for deposit. Each of the payees may utilize different depositary bank locations to present the checks for deposit. The depositary bank may process each check at a time the check is presented for deposit. The distribution of times and locations may alleviate a computing burden of processing the digital image at a central location. The distribution of times and locations may alleviate a computing burden of processing the digital image at a designated time.

Distributed processing of the digital image may allow a drawee to conduct a fraud analysis based on the transaction record. The drawee may conduct a fraud analysis when the check is presented for deposit. The drawee may provide a fraud indicator to the payee and/or depositary bank at the time the check is presented for deposit.

The drawee may specify fields of interest for inclusion in the transaction record. For example, the drawee may specify that for checks deposited in a particular area code, the transaction record may only include the following check segments: MICR data, the drawer's signature and the amount on the check. In other locales, the drawee may request that the transaction record include information from one or more segments of a check.

The method may include transmitting the transaction record to the drawee. The transmitting may include a request from the depositary bank that the drawee transfer funds to the depositary bank.

Methods may include receiving, from the drawee, a fraud detection analysis result based on the transaction record. For example, the drawee may provide financial services to the drawer. The drawee may maintain financial records of past transactions executed by the drawer. The financial records may include a plurality of checks and/or segments of negotiable instruments. The plurality of checks and/or segments may include historical checks and/or segments (collectively "historical checks") issued by the drawer. The historical checks may include an order for the drawee to pay an amount to the payee.

For example, the fraud detection analysis may include comparing an amount extracted from the digital image to historical amounts associated with an account number extracted from the digital image. The fraud detection analysis may include comparing the amount extracted from the digital image to historical amounts associated with the payee.

Upon receipt of the transaction record, one or more fields of transaction record may be compared to one or more segments of the historical checks.

The fraud detection analysis may include comparing the signature of the drawer on the negotiable instrument to a signature file associated with an account number on the negotiable instrument. The signature of the drawer on the negotiable instrument may be compared to a signature obtained when opening an account.

For example, the transaction record may include a signature of the drawer. Upon receipt of the transaction record, the drawee may compare the signature of drawer in the transaction record to a known signature used by the drawer to authorize a past transaction. The fraud detection analysis may include consideration of a variability of a handwritten signature and a possibility of multiple signatures/signatories on a check.

The transaction record may include a handwritten signature. The transaction record may include multiple handwritten signatures. The fraud detection analysis may include converting a signature from a handwritten entry into text. The converting may be performed by a processor. The processor may be further configured to run an application that translates content of a segment from handwriting to estimated block text. The application may be may be an application such as PARASCRIPT®. The application may be any suitable application. The application may process the segment content extracted from the digital image by applying any suitable technique.

The fraud detection analysis may include comparing one or more fields of the transaction record to a purchase pattern of the drawer. For example, a payee may be identified based on information extracted from the digital image. The drawee, upon receipt of the transaction record may search if the drawer has, in the past, issued a check to the identified payee. If the drawer has issued a check to the identified payee, the drawer may identify a typical amount associated with the payee. If the amount included in the transaction record exceeds a threshold associated with the typical amount, the check may be flagged as potentially fraudulent.

As a further example, the purchase pattern associated with the drawer may indicate that the drawer has issued one or more checks to the payee that include an average amount of $250.00. If the transaction record includes an amount of $5,000.00, the fraud analysis may flag the check received from the depositary bank as potentially fraudulent.

The transaction record may be a first transaction record. The fraud detection analysis may include comparing the first transaction record to a second transaction record. The comparing may be performed by the drawee. For example, the drawee may maintain historical transaction records received from one or more depositary banks. Each of the historical transactional records may be associated with an account number and/or a drawer. The fraud analysis may search for patterns within the historical transaction records. The check may be flagged as potentially fraudulent if the transaction record associated with the check deviates by more than a threshold number from a pattern identified within the historical transaction records.

Illustrative deviations from identified patterns that may be considered during fraud detection analysis may include a high profile purchase, a high amount, and/or an anti-pattern expenditure.

The high profile purchase may include a payee that is associated with a high frequency of fraudulent checks. The high profile purchase may include a location that is associated with a high frequency of fraudulent checks. The high profile purchase may include a drawer that is famous or well known, such as a celebrity.

For example, historical records may reveal that a particular celebrity issues checks for irregular amounts. If the fraud analysis detects that the drawer is the celebrity, the amount indicated on the check may not cause the check to be flagged as potentially fraudulent.

The fraud analysis may include processing of a security feature included on check. The security feature or an image of the security feature may be included in the transaction record. An illustrative security feature may include encrypted account-verification information. The encrypted account-verification information may be printed on a check as bar-code. A bar code may include a quick response ("QR") code.

The transaction record may include the bar code as printed on an issued check. The drawee may receive the transaction record and decode the encrypted account-verification information. The drawer may authenticate that the decoded information includes a valid account of the drawer at the drawee.

The drawee may cross-check the decoded information based on other fields of the transaction record. The drawer may verify that information encoded in the bar code corresponds to other fields of the transaction record.

For example, the bar code may indicate a particular check number. The transaction record may include a check number extracted from the face of the check. The fraud detection analysis may ascertain whether the check number included in the decoded information matches the check number printed on the face of the check. A mismatch may indicate a potentially fraudulent check.

Additional illustrative security features may include encoded biometric information or a chip embedded within a negotiable instrument. The chip may be configured to respond to a prompt that includes a pre-determined key. The fraud detection analysis may be configured to transmit the prompt.

Methods may include accepting the negotiable instrument from the payee. The accepting may include receiving a fraud indicator from the drawee. The accepting may include transmitting a fraud indicator from the drawee to the depositary bank. The accepting may include transmitting a fraud indicator from the drawee to the payee.

The fraud indicator may signify a level of risk associated with the check deposited by the payee. The level of risk may be associated with a likelihood that the check is fraudulent. The fraud indicator may be based on the fraud analysis conducted by the drawee.

The receiving of the negotiable instrument may include receiving the negotiable instrument at an automated teller machine ("ATM"). The accepting may include accepting the negotiable instrument at an ATM. The receiving ATM and/or the accepting ATM may be associated with the depositary bank, either directly or through a consortium of financial institutions. The receiving ATM and/or the accepting ATM may be an identical ATM.

An ATM may be configured to generate the transaction record based on the digital image. The ATM may be configured to transmit the transaction record to the drawee. The ATM may be configured to receive the fraud analysis and/or the fraud indicator from the drawee. The ATM may be configured to convey the fraud analysis/indicator to the payee. The fraud analysis/indicator may be conveyed to the payee during an ATM session initiated by a request from the payee to deposit the negotiable instrument.

Based on the fraud indicator, the payee may choose to abort a deposit of the check. For example, the payee may choose to return the check to the drawer and request an alternative form of payment. The alternative form of payment may be associated with a lower risk of fraud. The payee may inform the drawer of the level of risk assessed by the drawee. The payee and/or depositary bank may receive a fraud indicator from the drawee at the time the check is presented for deposit at the ATM or the depositary bank. The ATM may retain a check flagged as potentially fraudulent. The ATM may provide the payee an image of a check flagged as potentially fraudulent.

The accepting may include agreement of the drawer to pay an amount to a bank of the payor. The accepting may be based on a result of the fraud detection analysis.

Apparatus may include an article of manufacture comprising a computer usable medium having computer readable program code embodied therein. The computer readable program code may include code for requesting a deposit of a negotiable instrument. The negotiable instrument may include an order of a drawer. The order may instruct a drawee to pay an amount to a payee.

The computer readable program code in said article of manufacture may include code for causing a computer at a depositary bank to generate a digital image of the negotiable image. The digital image may be generated at a location where the negotiable instrument is presented for deposit. The location may be the depositary bank. The location may be an ATM. The location may be an ATM associated with the depositary bank. The location may be an ATM associated with the drawee.

The apparatus may include computer readable program code for causing the computer to generate a transaction record based on the digital image. The transaction record may include information extracted from the digital image.

The apparatus may include computer readable program code for causing the computer to locate a signature of the drawer in the digital image of the negotiable instrument. The code may cause the computer to extract the signature from the digital image. The code may cause the computer to include the signature in a field of the transaction record.

Handwritten information of a check segment may be extracted from the digital image and converted into block text information. The transaction record may include the block text information. The transaction record may be generated at a location where the negotiable instrument is presented for deposit. The location may be the depositary bank.

The apparatus may include computer readable program code for causing the computer to transmit the transaction record to the drawee. The apparatus may include computer readable program code for causing the computer to receive a fraud indicator from the drawee. The fraud indicator may be based on the transaction record. The apparatus may include computer readable program code for causing the computer to decline crediting the amount to an account of the payee. The crediting may be declined based on the fraud indicator.

The apparatus may include computer readable program code for causing the computer to capture an image of an individual submitting the negotiable instrument to the depositary bank.

For example, a payee may present a check for deposit at an ATM. The ATM may generate a digital image of the check and generate a transaction record based on the digital image. The ATM may transmit the transaction record to a drawee. Based on the transaction record, the drawee may transmit to the ATM a fraud indicator that signifies that the account number associated with the signature of the drawee is non-existent. Upon receipt of the fraud indicator, the ATM may inform the payee that the request for deposit is denied. The ATM may include a camera. The camera may photograph the payee who requested the deposit.

The apparatus may include computer readable program code for causing the computer to decline crediting the amount to an account of the payee without receiving a fraud indicator from the drawee. For example, information extracted from the digital image may not correspond to MICR data printed on the negotiable instrument. This may occur if MICR data printed on the check includes an invalid sequence.

The sequence may be invalid if the MICR data does not include a correct number of digits or spaces. The sequence may be invalid if the MICR data indicates an account number that is not properly paired to a routing number. For example, the routing number and account number may not correspond to a recognized drawee.

The depositary bank may conduct a fraud analysis. For example, the transaction record may include identification of an amount in words handwritten on the check. The transaction record may include identification of the amount based on numbers handwritten on the check. The depositary bank may convert the handwritten entries into block text and conclude that the handwritten numbers on the check do not match the amount as described by the words handwritten on the check. Based on the mismatch, the depositary bank may decline crediting the amount to an account of the payee.

Apparatus may include a system for processing a request of a payor to credit an amount to an account of a payee. The payor may be a drawer. The system may include a self-service kiosk associated with a first financial institution. The first financial institution may include a financial institution that accepts a negotiable instrument for deposit. The first financial institution may be a depositary bank.

The self-service kiosk may include a scanner. The scanner may be configured to capture a digital image of the negotiable instrument. The kiosk may include a first processor device programmed to construct a transaction record based on the digital image.

The system may include a fraud-detection apparatus associated with a second financial institution. The second financial institution may include a drawee. The fraud detection apparatus may include a second processor device programmed to derive a fraud indicator. The second processor device may be programmed to derive the fraud indicator based on the transaction record.

The system may include a financial network linking the first financial institution and the second financial institution. The financial network may be operated by a party that is not the drawee and is not the depositary bank. The financial network may link a plurality of financial institutions. The plurality of financial institutions may include drawees, depositary banks and any suitable financial institution.

For example, the financial network may be a transaction processing network. Transaction processing network services offered under the trademarks VISA, MASTERCARD, NYCE and PULSE are known. Transaction processing networks typically set interchange rates. Interchange rates often depend for each transaction processing network on financial institution type and size, transaction processing method and other factors.

The network may be configured to route the transaction record from the self-service kiosk to the fraud-detection apparatus. The network may be configured to route the fraud indicator from the fraud-detection apparatus to the self-service kiosk.

The transaction record may include a signature extracted from the digital image. The transaction record may include one or more data fields. The one or more data fields may include text derived from a segment of the negotiable instrument. The segment of the negotiable instrument may be extracted from the digital image. The transaction record may include a logo extracted from the digital image. The logo may be associated with a drawee. The self-service kiosk may identify the drawee based on the logo. The fraud-detection apparatus may identify the drawee based on the logo.

The fraud detection apparatus may be configured to derive the fraud indicator based on comparing the text derived from the segment of the negotiable instrument to historical data associated with the payor. The comparing may be conducted by the second financial institution. The fraud detection apparatus may be configured to derive the fraud indicator based on a purchase pattern associated with the payor. The fraud detection apparatus may be configured to derive the fraud indicator based on any suitable pattern associated with the payor. A suitable pattern may be based on the historical data associated with the payor.

Apparatus may include a network configured to route a authentication request from a first financial institution to a second financial institution. The first institution may be a drawee or depositary bank. The network may include a first node. The first node may be associated with the first institution. The first node may be configured to digitize a negotiable instrument. The first node may be configured to generate a digital image of a negotiable instrument.

The first node may be configured to transmit the authentication request to the second institution. The authentication request may include a transaction record derived from a digital image and/or segment of the negotiable instrument. The first node may be configured to receive a fraud indicator from the second institution.

The network may include a second node. The second node may be associated with the second institution. The second institution may be a drawee or a depositary bank. The second node may be configured to receive the authentication request from the first institution. The second node may be configured to transmit the fraud indicator to the first institution.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 4:
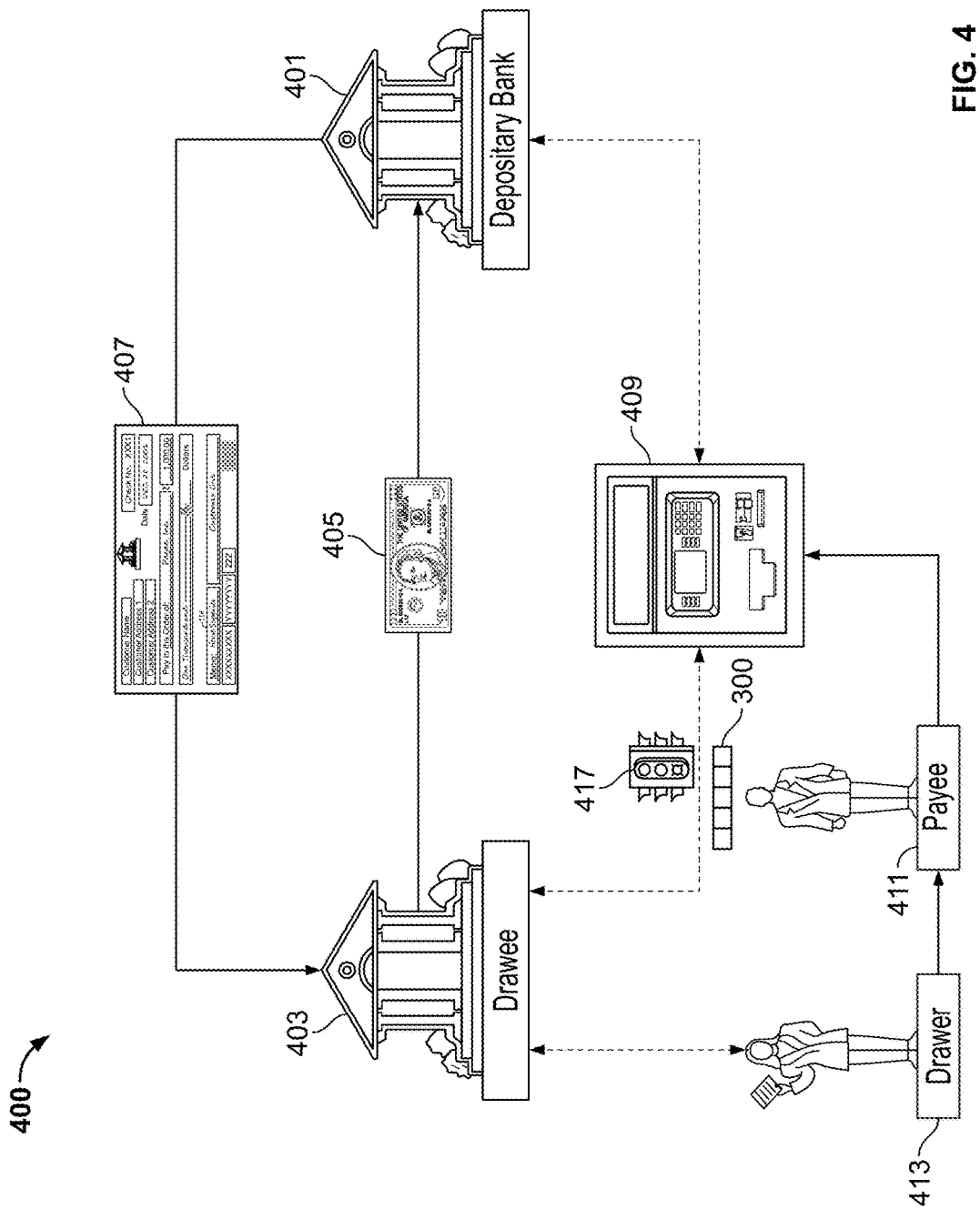
FIG. 4 shows an illustrative arrangement in which apparatus and methods in accordance with the principles of the invention may be used.

FIG. 4 shows illustrative arrangement 400. Arrangement 400 may include participants such as a drawer, a drawee, a payee and a depositary bank that are identified below.

Drawer 413 may issue a negotiable instrument to payee 411. The negotiable instrument may include an order issued by drawer 413. The order may direct drawee 403 to pay an amount, the amount indicated on the negotiable instrument, to payee 411. The negotiable instrument may be a check.

Payee 411 may initiate a session at self-service kiosk 409. The self-service kiosk may be an ATM. During the session, payee 411 may request that depositary bank 401 credit an account of the payee based on the deposit of the negotiable instrument. Self-service kiosk 409 may be associated with drawee 403. Self-service kiosk 409 may be associated with depositary bank 401. Self-service kiosk 409 may be associated with a financial institution that is neither drawee 403 nor depositary bank 401. Computing resources associated with fraud detection may be distributed among drawee 403, depositary bank 401 or any suitable party.

Self-service kiosk 409 may be configured to generate digital image 407 of the negotiable instrument. Self-service kiosk 409 may be configured to generate transaction record 300 (shown in FIG. 3) based on information extracted from digital image 407. Digital image 407 and transaction record 300 may be generated during the session initiated by payee 411 at self-service kiosk 409.

Transaction record 300 may be transmitted to drawee 403. Self-service kiosk 409 may transmit image 407 to drawee 403. Drawee 403 may be identified based on MICR data on the negotiable instrument. Drawee 403 may be identified based on any suitable information extracted from digital image 407. Drawee 403 may conduct a fraud detection analysis based on transaction record 300.

The fraud analysis may include comparing one or more fields of transaction record 300 to financial information known or accessible to drawee 403. Drawee 403 may transmit fraud indicator 417 to payee 411. Fraud indicator 417 may be transmitted to depositary bank 401. Fraud indicator 417 may be transmitted to payee 411 before payee 411 ends the session at self-service kiosk 409.

Based on fraud indicator 417, drawee 403 may transfer funds 405 to depositary bank 401. The amount of funds 405 may correspond to an amount extracted from digital image 407.

Depositary bank 401 may transmit digital image 407 to drawee 403. Drawee 403 may securely store digital image 407. Drawee 403 may securely store transaction record 300.

Figure 5:
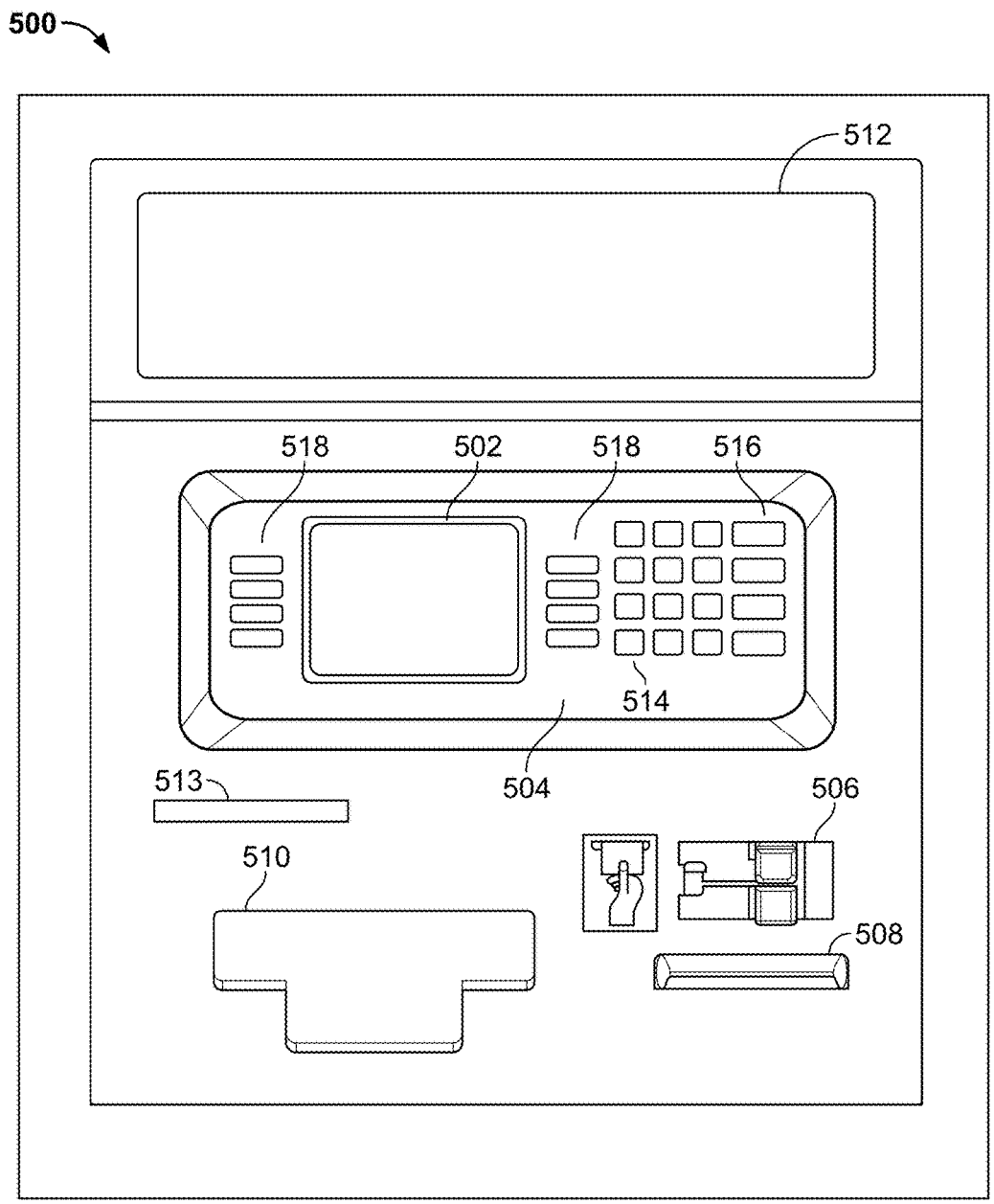
FIG. 5 shows an illustrative apparatus in accordance with the principles of the invention.

FIG. 5 shows an illustrative self-service kiosk 500. Kiosk 500 may be an ATM. Kiosk 500 may include monitor 502, keypad 504, card reader port 506, document acceptor 513, item dispensers 510 and 508 and security screen 512.

Monitor 502 may exchange visual and or audio information with a customer. The customer may be payee 411 (shown in FIG. 4). Keypad 504 may include alphanumeric keys 514 for the customer to enter numerical and textual data. Keypad 504 may include control keys 516. In some embodiments, control keys 516 may be used to communicate control information, such as instructions, to kiosk 500. Keypad 504 may include soft keys 518. Soft keys 518 may have functions that are dictated by programming and are presented to the customer using information that may be displayed on monitor 502.

Card reader port 506 may be the front end of any suitable card reader. The card reader may read magnetically encoded information on transaction instruments such as bank cards. In some embodiments, self-service device 500 may include a contactless chip reader, a wireless transceiver or any other suitable transmission interface. The transmission interface may exchange transaction information with a transaction instrument or network. The transaction instrument may be a chip, an RFID tag, a smart card, a PDA, a telephone or any other suitable device. The transaction information may include a digital image or transaction record.

In some embodiments, self-service kiosk 500 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 513 may accept any suitable documents. For example, document acceptor 513 may accept negotiable instruments, deposit forms, bills, or any other suitable documents. Document acceptor 513 may feed into a scanner (not shown) that digitizes the documents for image-based transaction processing.

Item dispenser 510 may dispense items. For example, item dispenser 510 may dispense bills. Item dispenser 508 may dispense items. For example, item dispenser 508 may dispense a transaction receipt. The transaction receipt may include image 100 (shown in FIG. 1).

Security screen 512 may visually screen a surveillance device (not shown). The surveillance device may provide video information about individuals that are present near the kiosk and the conditions there. The surveillance device may include a camera configured to capture an image of individuals that are present near the kiosk and the conditions there.

Figure 6:
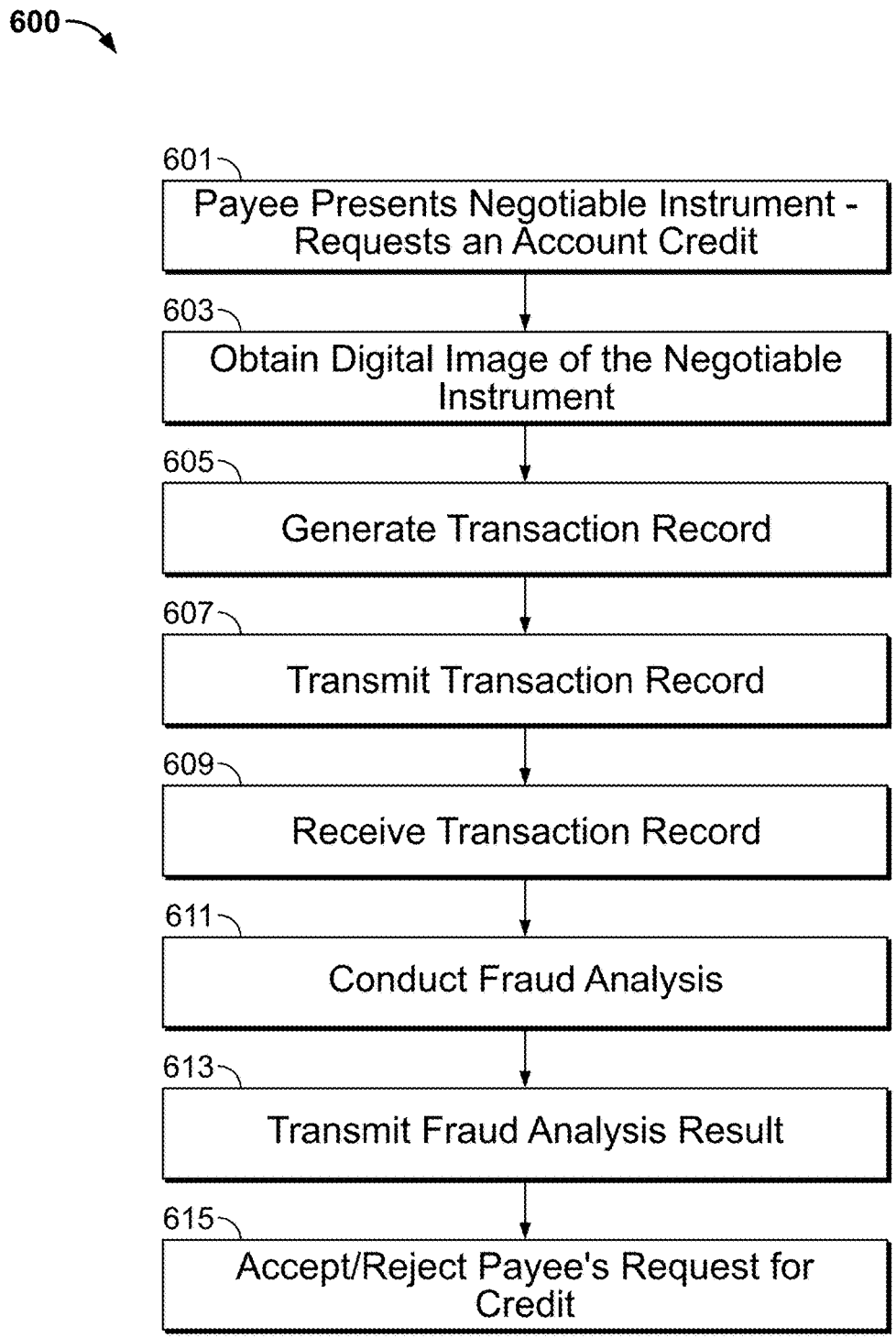
FIG. 6 shows an illustrative process in accordance with the principles of the invention.

FIG. 6 shows an illustrative process 600. At step 601, a payee presents a negotiable instrument for deposit. At step 601 the payee may request a credit to an account. At step 603, a digital image of the negotiable instrument is generated. The digital image may be generated by an ATM configured to accept negotiable instruments for deposit. At step 605, a transaction record is generated. The transaction record may be generated based on the digital image.

At step 607, the transaction record is transmitted. The transaction record may be transmitted to a drawee. At step 609, the transaction record is received. The transaction record may be received by a drawee. At step 611, the recipient conducts a fraud analysis. The fraud analysis may be conducted based on the transaction record. At step 613, a fraud analysis result is transmitted. The fraud analysis result may be transmitted to the ATM that generated the digital image/transaction record.

At step 615, the payee's request for credit may be accepted or rejected. The request for credit may be accepted or rejected based on the result of the fraud analysis. The ATM may inform the payee of acceptance/rejection of the request before the payee leaves a vicinity of the ATM.

Figure 7:
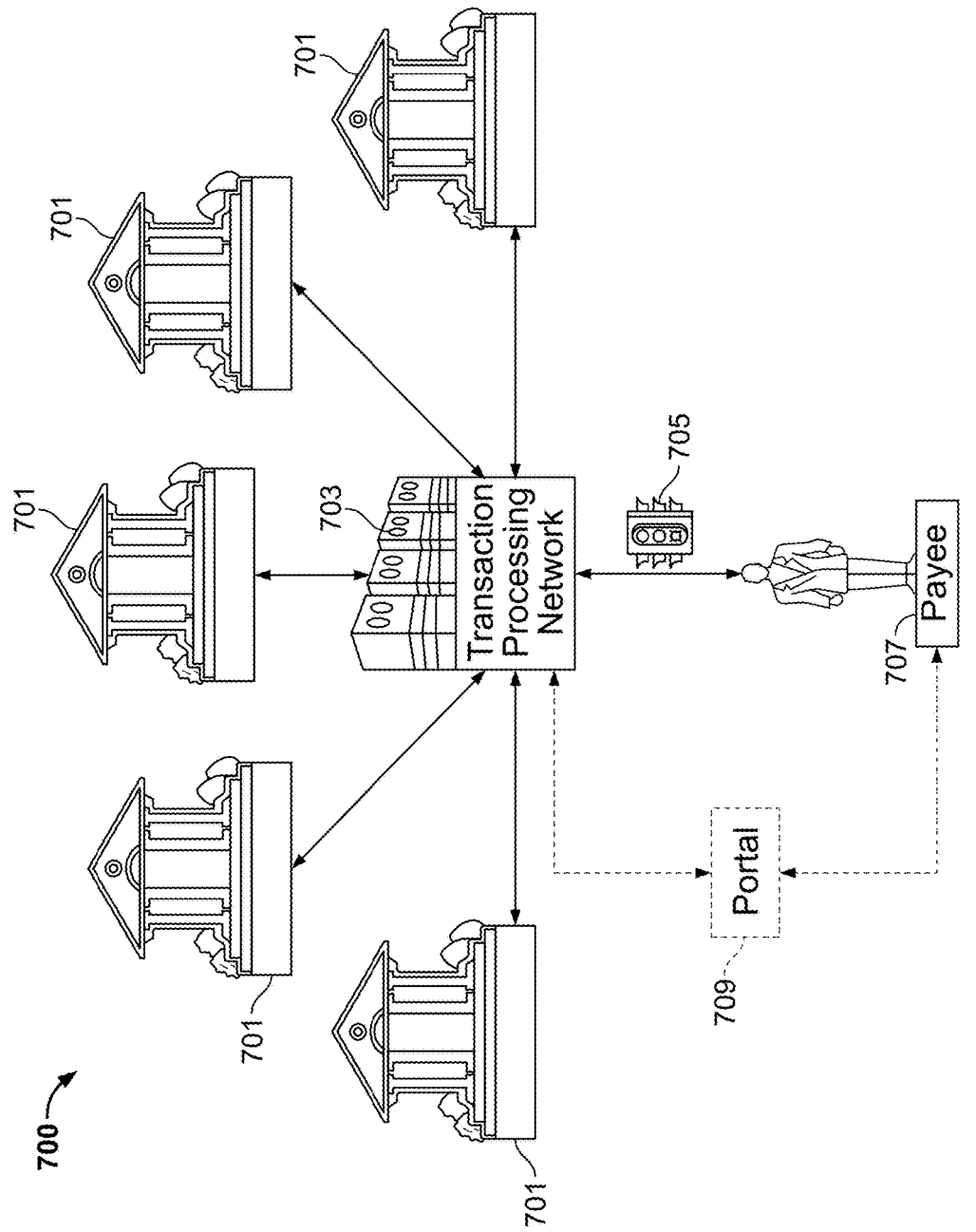
FIG. 7 shows another arrangement in which apparatus and methods in accordance with the principles of the invention may be used.

FIG. 7 shows illustrative arrangement 700. Arrangement 700 may include financial institutions 701. Financial institutions 701 may include drawees, depositary banks or any other suitable financial institutions or networks. Financial institutions 701 may be linked to each other via transaction processing network 703. Transaction processing network 703 may receive information submitted by payee 707. Payee 707 may submit a negotiable instrument for deposit. A transaction record may be generated based on a digital image of the negotiable instrument. A transaction record may be generated directly from a "hard copy" of the negotiable instrument.

Transaction processing network 703 may transmit the transaction record to one or more of financial institutions 701. Transmission of the transaction record may utilize less bandwidth of network 703 than transmission of a digital image of the negotiable instrument. One or more of financial institutions 701 may conduct a fraud analysis based on the transaction record. One or more of financial institutions 701 may transmit fraud indicator 705 to network 703. Network 703 may communicate fraud indicator 705 to payee 707. Network 703 may communicate fraud indicator 705 to a financial institution 701.

Arrangement 700 may include portal 709. Payee 707 may access network 703 via portal 709. Portal 709 may include an online banking portal. Portal 709 may include an ATM. Portal 709 may include any suitable device or method for accessing network 703.

Figure 8:
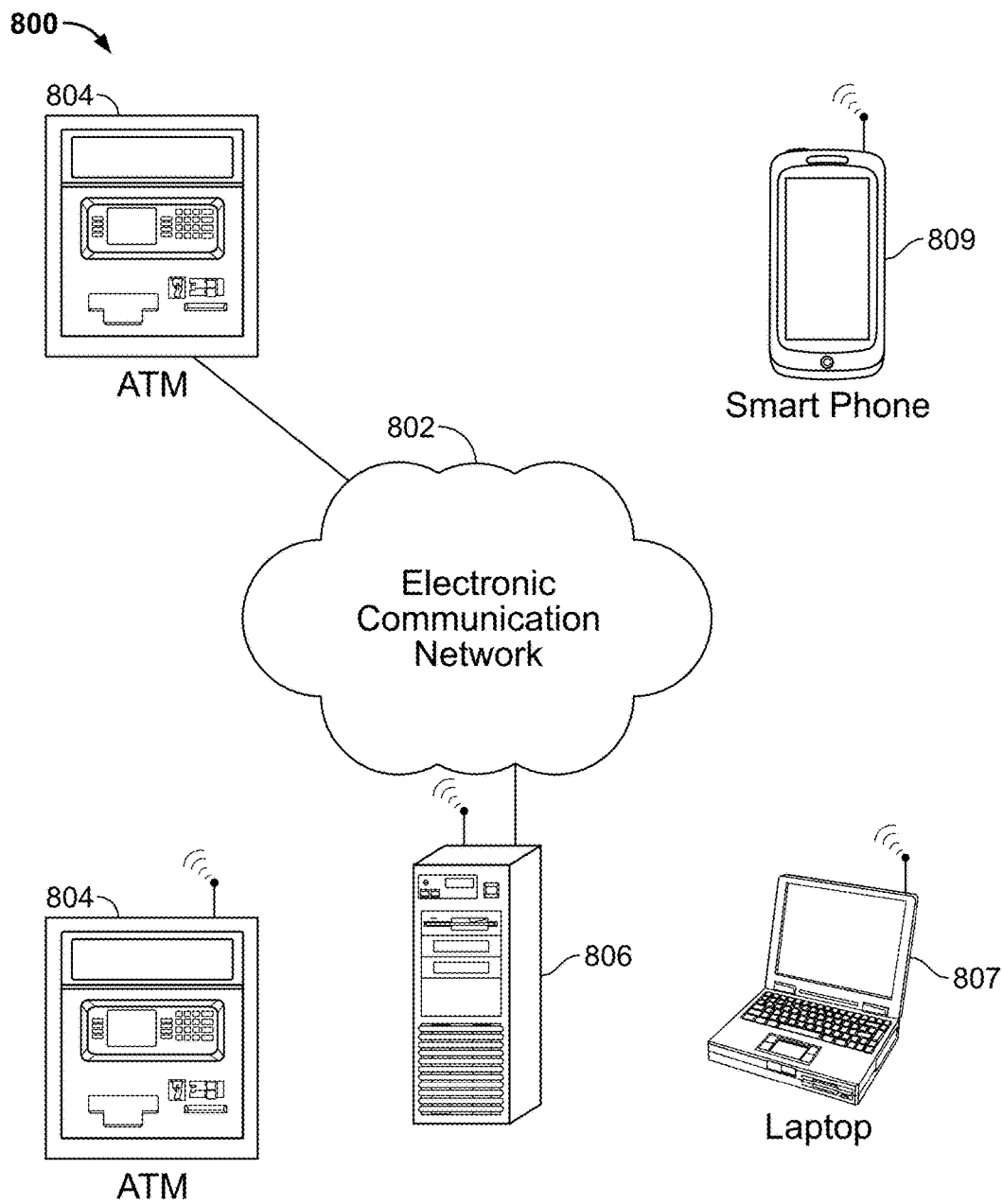
FIG. 8 shows yet another arrangement in which apparatus and methods in accordance with the principles of the invention may be used.

FIG. 8 shows illustrative arrangement 800. Arrangement 800 includes smart phone 809, laptop 807, server 806, and ATMs 804. ATMs 804 may include one or more features of ATM 500 (shown in FIG. 5). ATMs 804 may be configured to receive a negotiable instrument for deposit. The negotiable instrument may include one or more features of image 100 (shown in FIG. 1) or image 200 (shown in FIG. 2). ATMs 804 may be configured to generate a transaction record based on the negotiable instrument. The transaction record may include one or more features of transaction record 300 (shown in FIG. 3).

ATMs 804 may transmit the transaction record to server 806 via network 802. Network 802 may include one or more features of network 703 (shown in FIG. 7). Server 806 may be configured to conduct a fraud analysis based on the transaction record. Server 806 may transmit a fraud indicator to ATMs 804. The fraud indicator may include one or more features of fraud indicator 417 (shown in FIG. 4).

Smart phone 809 or laptop 807 may be configured to capture a digital image of a negotiable instrument. Smart phone 809 or laptop 807 may generate a transaction record and transmit the transaction record to server 806 via network 802. Server 806 may transmit a fraud indicator to smart phone 809 or laptop 807.

Figure 9:
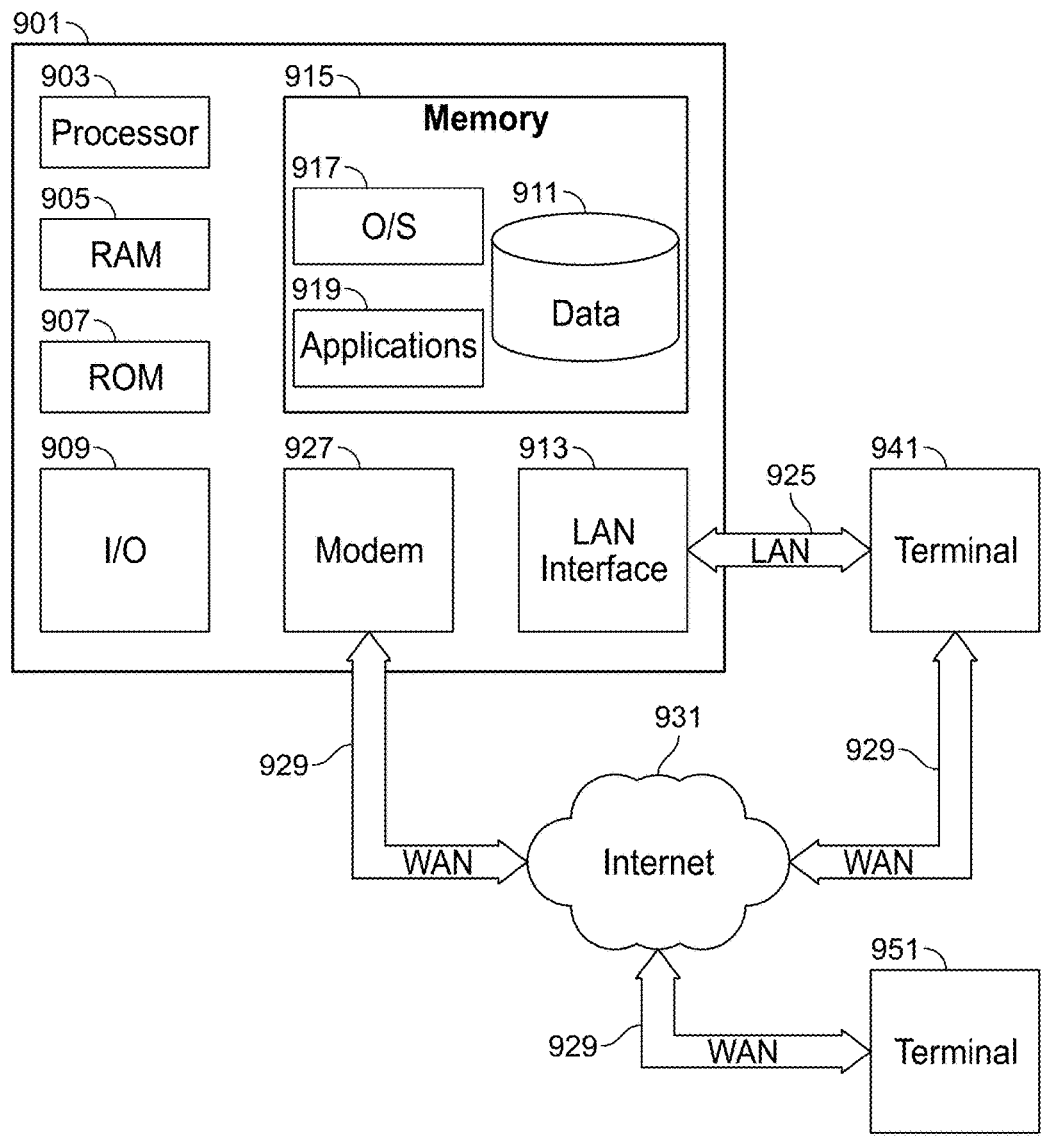
FIG. 9 shows another illustrative apparatus in accordance with the principles of the invention.

FIG. 9 is a block diagram that illustrates a generic computing device 901 (alternatively referred to herein as a "server") that may be used in accordance with the principles of the invention. Server 901 may be included in any suitable apparatus that is shown or described herein.

Server 901 may have a processor 903 for controlling overall operation of the server and its associated components, including RAM 905, ROM 907, input/output module 909, and memory 915.

Input/output ("I/O") module 909 may include a microphone, keypad, touch screen, and/or stylus through which a user of device 901 may provide input, and may also include one or more of a speaker for providing audio output and a video display device for providing textual, audiovisual and/or graphical output. Software may be stored within memory 915 and/or storage to provide computer executable instructions to processor 903 for enabling server 901 to perform various functions. For example, memory 915 may store software used by server 901, such as an operating system 917, application programs 919, and an associated database 911. Alternatively, some or all of server 901 computer executable instructions may be embodied in hardware or firmware (not shown). Database 911 may provide storage for digital images, transaction records, financial information, signatures and/or any other suitable information.

Server 901 may operate in a networked environment supporting connections to one or more remote computers, such as terminals 941 and 951. Terminals 941 and 951 may be servers that include many or all of the elements described above relative to server 901. The network connections depicted in FIG. 9 include a local area network (LAN) 925 and a wide area network (WAN) 929, but may also include other networks such as an intranet. When used in a LAN networking environment, computer 901 is connected to LAN 925 through a network interface or adapter 913. When used in a WAN networking environment, server 901 may include a modem 927 or other means for establishing communications over WAN 929, such as Internet 931. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 919, which may be used by server 901, may include computer executable instructions for invoking user functionality related to communication, such as email, short message service (SMS), and voice input and speech recognition applications.

Computing device 901 and/or terminals 941 or 951 may also be mobile terminals including various other components, such as a battery, speaker, and antennas (not shown).

Terminal 951 and/or terminal 941 may be portable devices such as a laptop, cell/smart phone, tablet, or any other suitable device for storing, transmitting and/or transporting relevant information.

Any information described above in connection with database 911, and any other suitable information, may be stored in memory 915.

One or more of applications 919 may include one or more algorithms that may be used to provide a fraud analysis.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Thus, methods and apparatus for distributed processing of a check image have been provided. Persons skilled in the art will appreciate that the present invention can be practiced by other than the described embodiments, which are presented for purposes of illustration rather than of limitation, and that the present invention is limited only by the claims that follow.

What is claimed is:

1. A distributed system for processing of checks the system comprising:
   a plurality of automated teller machines ("ATMs") located in different geographic locations and operated by a depositary bank, each of the ATMs configured to communicate over a first electronic network connecting the ATMs to the depositary bank, each of the ATMs comprising:
   a document acceptor configured to draw a check deposited by a payee into an ATM during an ATM' session initiated by the payee;
   a scanner configured to capture a digital image of the cheek drawn into the ATM; a first processor device programmed to:
   construct an electronic transaction record based on the digital image, the electronic transaction record having a smaller file size than the digital image; and
   identify a drawee bank associated with the check;
   a network adapter that is configured to transmit the electronic transaction record to the drawee bank;
   a distributed fraud-detection apparatus operated by the drawee bank that communicates over a second electronic network with the drawee bank, the distributed fraud detection comprising a second processor device programmed to derive a fraud indicator for each electronic transaction record transmitted by each of the ATMs operated by the depositary bank;
   an electronic financial network linking each of the ATMs operated by the depositary bank and the distributed fraud-detection apparatus operated by the drawee bank, the network configured to route:
   electronic transaction records constructed by each of the ATMs operated by the depositary bank to the fraud-detection system operated by the drawee bank; and
   a plurality of fraud indicators from the fraud-detection apparatus operated by the drawee bank to each of the ATMs operated by the depositary bank; wherein:
   each of the ATMs is configured to receive instructions from the drawee bank that programs each of the first processors to limit the transaction record to information that is extracted from pre-determined cheek segments of the digital image;
   the pre-determined segments are determined by the drawee bank based on the different geographic locations of each ATM;
   the distributed fraud detection apparatus is configured to process each transaction record during the ATM session thereby distributing processing of checks received by each of the plurality of ATM and alleviating a computing burden of processing the checks at a central location at a designated time;
   the processing of each transaction record comprises deriving the fraud indicator associated with the transaction record;
   in response to determining that a fraud indicator received from the fraud-detection apparatus operated by the drawee bank indicates a level of fraud that is below a threshold, the ATM operated by the depositary bank that received the fraud indicator is configured to allow the payee to withdraw cash corresponding to funds specified in the check deposited by the payee during the ATM session; and
   in response to determining that the fraud indicator received from the drawee bank indicates a level of fraud that is above the threshold, the ATM operated by the depositary bank that received the fraud indicator is configured to:
   retain the check within the ATM;
   deny a request of the payee to withdraw cash corresponding to funds specified in the check; and
   deny the transfer of funds from the payor to the payee.

2. The system of claim 1, the pre-determined check segments comprising a signature extracted from the digital image, and the fraud detection apparatus is further configured to derive the fraud indicator based on comparing the signature extracted from the digital image to a signature accessible to the drawee bank on the second electronic network.

3. The system of claim 1, the pre-determined check segments comprising a logo extracted from the digital image, and the fraud detection apparatus is further configured to derive the fraud indicator based on comparing the logo extracted from the digital image to a logo accessible to the drawee bank on the second electronic network.

4. The system of claim 1, the fraud detection apparatus configured to derive the fraud indicator based on comparing the text derived from the predetermined check segments to historical data associated with the payor.

5. The system of claim 1, the fraud detection apparatus configured to derive the fraud indicator based on a purchase pattern associated with a payor.

* * * * *